No. 877,845. PATENTED JAN. 28, 1908.
I. KITSEE.
PHONOGRAPHY.
APPLICATION FILED AUG. 1, 1907.
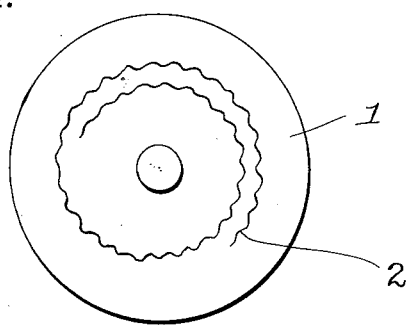
ORIGINAL TRANSPARENT RECORD
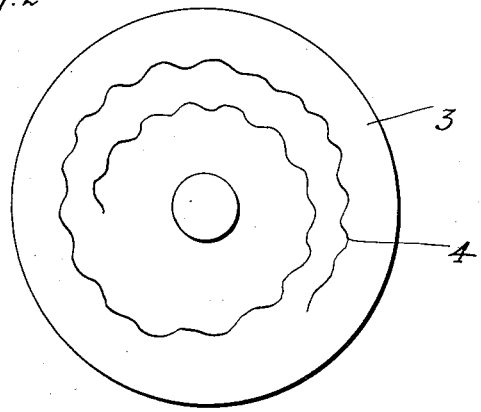
SOUND AMPLIFYING RECORD

UNITED STATES PATENT OFFICE.

ISIDOR KITSEE, OF PHILADELPHIA, PENNSYLVANIA.

PHONOGRAPHY.

No. 877,845.  Specification of Letters Patent.  Patented Jan. 28, 1908.

Application filed August 1, 1907. Serial No. 386,676.

*To all whom it may concern:*

Be it known that I, ISIDOR KITSEE, citizen of the United States, residing at Philadelphia, in the county of Philadelphia and State of Pennsylvania, have invented certain new and useful Improvements in Phonography, of which the following is a specification.

My invention relates to an improvement in phonography.

Its object is to increase the efficiency of phonographic records by producing them in such manner as to impart thereto capacity for amplifying the sound in the reproduction of the sound waves, and thereby overcoming the necessity for employing mechanical devices to obtain such amplification.

The underlying principle of my invention consists in the enlargement of the original record and also in the production of copies from said enlargement.

In the drawings, Figure 1 is a plan view conventionally illustrating an original transparent record. Fig. 2 is a similar view of a sound amplifying copy of the record disclosed in Fig. 1.

The mode of procedure is as follows:—

I, first, produce the original record in a manner, so that the same can be photographed. I, preferably, produce the original record on a material transparent to the rays of light with a material opaque to said rays. A glass plate, or a sheet of tracing cloth, is well adapted for the purpose in question, and the lines representing the sound waves may be traced thereon with a colored crayon, or a free flowing colored liquid.

The so produced original record is then subjected to an enlargement process with the aid of photography; that is, an enlarged photographic copy is taken from the original. I do not need to describe here the method of taking enlarged photographic copies from originals, as this process is well understood by persons versed in the art.

The plate on which the enlarged copy is produced is, preferably, of a material transparent to the rays of light, and as the photographed phonographic lines are opaque to the rays of light, it is obvious that this enlarged copy can be used in the same manner as the original may be used if enlarged copies were not necessary. From these enlarged copies, I produce commercial copies,—by preference,—with the aid of the photo-gravure process, a process which is well understood by persons practicing the art.

By way of illustration of the hereindescribed invention, I have shown conventionally in Fig. 1 an original transparent record, the numeral 1 designating the body thereof, and 2 the lines representing the sound waves, while in Fig. 2 is shown a sound amplifying copy. In the latter the numeral 3 designates the body of the record and 4 the amplifying lines.

The great advantage of being able to have commercial copies which reproduce the sound waves in an enlarged volume and with greater force is readily appreciated, and with the above described method, it lies in the power of the person producing the original and copies to so enlarge the original that any volume of sound may be produced from the commercial copy. It will thus be seen that the present invention enables commercial records to be produced capable of amplifying the sound, or increasing the volume of sound over the original records, and thus the necessity for employing mechanical devices for obtaining such amplification is entirely overcome.

Having now described my invention, what I claim as new and desire to secure by letters Patent is:—

1. The method of producing phonographic records capable of amplifying the sound volume of the originals, consisting in first obtaining an enlarged photographic copy from the original record, and then producing commercial copies from said enlarged copy.

2. The method of producing phonographic records capable of amplifying the sound volume of the originals, consisting in first producing the original record upon a transparent base by outlining the sound waves thereon through the medium of an opaque material, enlarging photographically the record so produced, and then producing commercial copies from the enlargement of the original.

3. The method of producing phonographic records capable of amplifying the sound volume of the originals, consisting in first producing the original record upon a transparent base by depositing thereon an opaque material in outline of the sound waves, enlarging photographically the record so produced, and then producing commercial copies from the enlargement of the original.

4. The method of producing phonographic records capable of amplifying the sound volume of the originals, consisting in first producing the original record upon a transparent base by imparting to the latter an opaque outline conforming to the sound waves, enlarging photographically the record so produced, and then producing commercial copies from the enlargement of the original.

In testimony whereof I affix my signature in presence of two witnesses.

ISIDOR KITSEE.

Witnesses:
EDITH R. STILLEY,
MARY C. SMITH